(12) United States Patent
Edenfeld

(10) Patent No.: US 7,514,809 B2
(45) Date of Patent: Apr. 7, 2009

(54) EXCITATION VOLTAGE SUPPLY FOR SYNCHRONOUS GENERATOR USED IN A WIND TURBINE, AND METHOD OF STARTING A WIND TURBINE HAVING SUCH EXCITATION VOLTAGE SUPPLY

(75) Inventor: Thomas Edenfeld, Osnabrück (DE)

(73) Assignee: General Electric Company, Schenectady, NY (US)

( * ) Notice: Subject to any disclaimer, the term of this patent is extended or adjusted under 35 U.S.C. 154(b) by 49 days.

(21) Appl. No.: 11/560,448

(22) Filed: Nov. 16, 2006

(65) Prior Publication Data

US 2008/0136185 A1 Jun. 12, 2008

(51) Int. Cl.
*H02P 9/04* (2006.01)
(52) U.S. Cl. ....................................... 290/44
(58) Field of Classification Search ................... 290/44; 322/89
See application file for complete search history.

(56) References Cited

U.S. PATENT DOCUMENTS

| | | | |
|---|---|---|---|
| 5,798,631 A * | 8/1998 | Spee et al. ................ | 322/25 |
| 5,907,192 A | 5/1999 | Lyons et al. | |
| 6,285,090 B1 * | 9/2001 | Brutsaert et al. .............. | 290/55 |
| 6,750,633 B2 * | 6/2004 | Schreiber ..................... | 322/12 |
| 6,933,625 B2 * | 8/2005 | Feddersen et al. ............. | 290/44 |
| 7,015,595 B2 * | 3/2006 | Feddersen et al. ............. | 290/44 |
| 7,068,015 B1 * | 6/2006 | Feddersen ..................... | 322/89 |
| 7,298,056 B2 * | 11/2007 | Gizara ......................... | 290/54 |
| 7,332,894 B2 * | 2/2008 | Ichinose et al. ............... | 322/29 |
| 2005/0087124 A1 | 4/2005 | Dwilinski et al. | |
| 2007/0273155 A1* | 11/2007 | Barton et al. ................. | 290/44 |

FOREIGN PATENT DOCUMENTS

| | | | |
|---|---|---|---|
| DE | 10344392 A1 | | 6/2005 |
| JP | 59064000 A | * | 4/1984 |
| JP | 2001103795 A | * | 4/2001 |
| JP | 2003235298 A | * | 8/2003 |
| JP | 2004254456 A | * | 9/2004 |
| WO | WO2005/031160 A2 | | 4/2005 |
| WO | WO2005/031941 A1 | | 4/2005 |

* cited by examiner

*Primary Examiner*—Joseph Waks
(74) *Attorney, Agent, or Firm*—Global Patent Operation

(57) ABSTRACT

A wind turbine is disclosed. The wind turbine includes a synchronous generator having a stator and a rotor, and an AC-DC-AC link for coupling the synchronous generator to a grid, the AC-DC-AC link including a DC link. The DC link is used for supplying an excitation voltage to a rotor winding of the rotor. A DC-DC converter connects the DC link to the rotor winding of the rotor.

19 Claims, 3 Drawing Sheets

EXCITATION VOLTAGE SUPPLY FOR SYNCHRONOUS GENERATOR USED IN A WIND TURBINE, AND METHOD OF STARTING A WIND TURBINE HAVING SUCH EXCITATION VOLTAGE SUPPLY

BACKGROUND OF THE INVENTION

The present invention relates to the field of wind turbines, especially to wind turbines having an electrically excited synchronous generator, and more particular to the excitation voltage supply of such a synchronous generator. Furthermore, the present invention relates to the start-up process of such a wind turbine.

Synchronous electric generators have a rotor which is excited with direct current, typically via slip rings. An alternating voltage is generated in the stator windings by the rotating field of the rotor. In common designs, the rotor excitation voltage is taken from the utility grid and supplied to the rotor via a separate circuit. However, in cases of low grid voltage or even grid failure, i.e. zero grid voltage, the excitation voltage is no longer sufficient to ensure that the generator is still excited. Thus, it is not guaranteed that the converter making the grid connection can stay online. In particular, if the declining voltage of the rotor windings is used to feed the converter during low or zero grid voltage, a sufficient supply can only be maintained for a short time depending on the time constant of the generator.

Other known designs propose the use of an uninterruptible power supply (UPS) for buffering the excitation circuit of the rotor. Due to the UPS, a sufficient excitation voltage can be supplied to the rotor windings even during longer periods of low or zero grid voltage. However, the use of a UPS causes additional costs, increases the number of parts to be maintained and increases the weight of the turbine.

BRIEF DESCRIPTION OF THE INVENTION

In view of the above, a wind turbine including a synchronous generator having a stator and a rotor, an AC-DC-AC link for coupling said synchronous generator to a grid, wherein the DC link is connected to the rotor of said synchronous generator for supplying an excitation voltage to a rotor winding of said rotor, is provided.

Further aspects, advantages and features of the present invention are apparent from the dependent claims, the description and the accompanying drawings.

According to a first aspect of the invention, a wind power plant is provided, the wind power plant including an electrically excited synchronous generator having stator and rotor windings, an AC-DC-AC link for coupling said synchronous generator to a utility grid, wherein the DC link is connected to the rotor windings of said synchronous generator to apply an excitation voltage.

According to the above described aspect of the invention, the excitation voltage is supplied to the rotor windings from the DC link. In other words, the DC link voltage of the converter is used to feed the excitation circuit of the generator. Thus, the generator is maintained at operation and can recharge the DC link. This allows the turbine to stay online even during very long periods of low grid voltage or even zero grid voltage. Thus, the turbine can support the grid and compensate electrical losses in the converter as long as the wind rotor of the turbine is turning. Accordingly, the turbine's ride-though capability for low or zero voltage events is considerably enhanced. Furthermore, no UPS is required in the present arrangement, thus saving costs and maintenance effort. Moreover, even the normal excitation circuit supply from the grid can be omitted since the power supply from the DC link is sufficient for normal operation of the turbine.

According to another aspect of the present invention, an intermediate DC voltage circuit for a wind turbine is provided. The, intermediate DC voltage circuit includes a generator-side AC-DC inverter adapted to be coupled to stator windings of a synchronous generator of the wind turbine, a grid-side DC-AC inverter adapted to be coupled to a utility grid, a circuit connecting said generator-side AC-DC inverter and said grid-side DC-AC inverter, and a DC-DC converter adapted to be connected between said circuit and rotor windings of said synchronous generator.

According to a further aspect of the present invention, a method of starting a wind turbine with an electrically excited synchronous generator is provided. The method includes the steps of (a) opening a grid contactor; (b) closing a bypass contactor to bypass a grid-side DC-AC inverter of said wind turbine; (c) charging a DC link of said wind turbine; (d) supplying an excitation voltage to rotor windings of said synchronous generator, wherein said excitation voltage is supplied from the DC link; and (e) opening said bypass connector and closing said grid connector.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
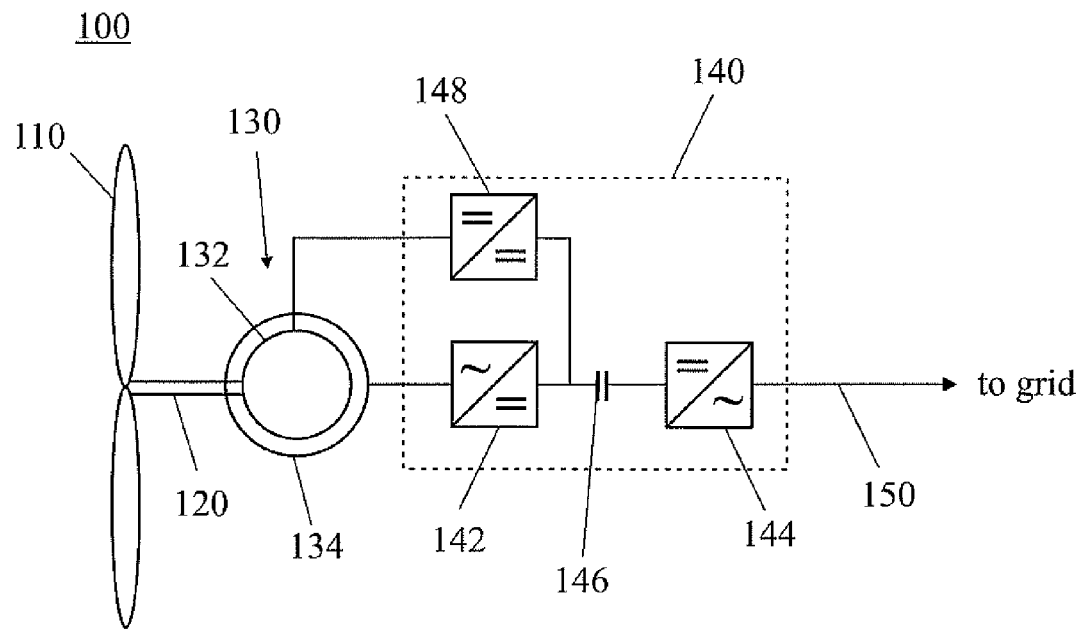
FIG. 1 shows a schematic view of a wind turbine according to an embodiment of the present invention.

FIG. 1 shows a schematic view of a wind turbine according to an embodiment of the present invention. Therein, a wind turbine 100 includes a wind rotor 110 which captures kinetic energy from the wind during operation and converts it into rotational energy. The wind rotor 110 is coupled to a rotor shaft 120 to which the rotational energy is transferred. Rotor shaft 120 is coupled to the rotor 132 of an electric generator 130, either directly or via a gear box (not shown). Electric generator 130 is a synchronous generator having a rotor 132 and a stator 134. During operation, a DC voltage is supplied to the windings of rotor 132 to create an excitation field. The rotation of rotor 132 induces an AC voltage in the windings of the stator 134. The stator windings are connected to a utility grid via an AC-DC-AC link 140 and a grid connection 150.

AC-DC-AC link 140 includes a grid-side AC-DC inverter 142 which is connected to a grid-side DC-AC inverter 144 via a DC link including a DC link capacitor 146. During operation of the turbine, the generator-side AC-DC inverter 142 converts the AC voltage generated by generator 130 to a DC voltage. This DC voltage is then reconverted by grid-side inverter 144 into an AC voltage having the required grid frequency. Thus, the variable speed of the wind rotor 110 does not interfere with the constant grid frequency. Prior to operation of AC-DC inverter 142 and DC-AC inverter 144, the DC link capacitor 146 is charged. Furthermore, it will be understood by those skilled in the art that the DC link is practically decoupled from the grid by DC-AC inverter 144.

Furthermore, the intermediate DC voltage circuit 140 according to an embodiment of the present invention includes a connection between the rotor 132 of generator 130 and the DC link. In particular, the DC link is connected to the rotor windings so that the rotor windings are excited. In the embodiment shown in FIG. 1, a DC-DC converter 148 is connected between the DC link and the rotor. Typically, the DC link has a voltage in the range of about 1000 Volts whereas the typical excitation voltages for the rotor windings are considerably smaller. A typical conversion ratio of the DC-DC converter is in the range of about 20:1 to 2:1, more typically in the range of about 12:1 to 5:1. In other words, the typical excitation voltage of the rotor windings is only a few hundred Volts. Due to the virtual decoupling of the DC link from the grid, the DC link voltage drops only about 1 to 10%, typically about 5%, during low grid voltage or zero grid voltage events. Therefore, the DC link voltage is sufficient for maintaining the excitation voltage of the rotor windings during such low grid voltage or zero grid voltage events. Thus, the generator 130 can recharge the DC link and compensate for losses of the inverters and converters as long as the wind rotor 110 is turning. Accordingly, a wind turbine including an intermediate DC voltage circuit 140 according to an embodiment of the present invention has improved low voltage or zero voltage ride-though capability for low or zero grid voltage events as long as one or more seconds. Furthermore, no UPS is required in the embodiments according to the present invention, thus saving costs and maintenance effort. Moreover, even the normal excitation circuit supply from the grid can be omitted since the power supply from the DC link is sufficient for normal operation of the turbine.

According to an even further embodiment of the present invention, the generator-side AC-DC inverter 142, the grid-side DC-AC inverter 144, and the DC-DC converter 148 connected between the DC link and the rotor windings can be integrated into one component as indicated by the dashed box in FIG. 1. Thus, the number of parts can be reduced even more. In particular, it will be understood by those skilled in the art that the inverters 142, 144 and the converter 148 may be realized by power electronics like IGBTs.

In the foregoing embodiment, the generator has been described as a typical slip ring synchronous generator. However, it will be understood by those skilled in the art that the present invention may also be applied to generators with brush-less exciters. Since the implementation of the present invention to generators with brush-less exciters does not pose any specific problems to those skilled in the art, the detailed description of such an embodiment is omitted to avoid redundancy.

Figure 2:
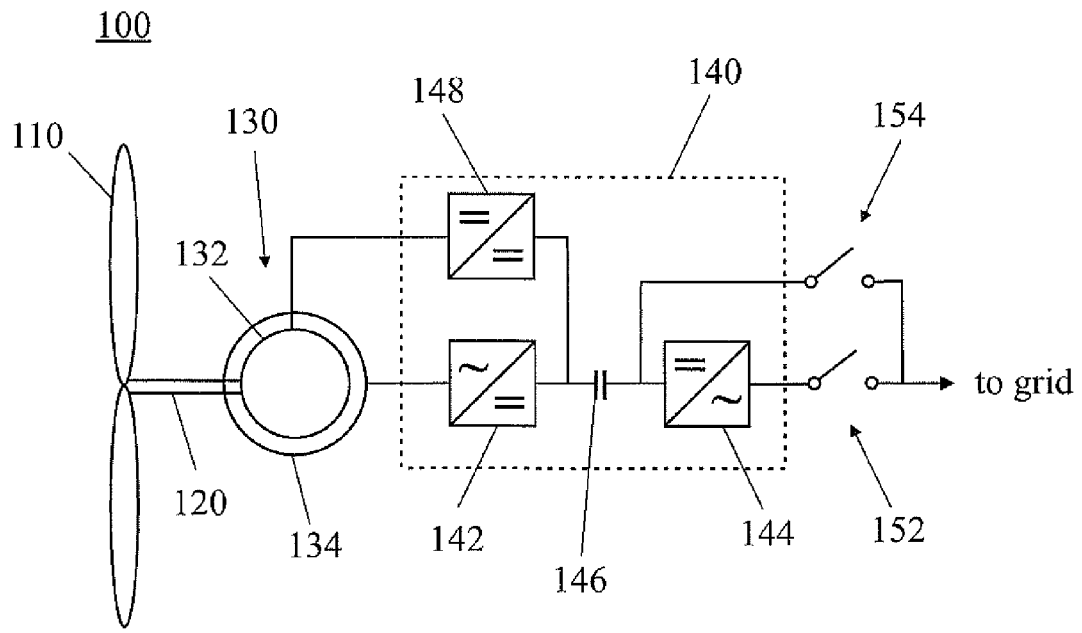
FIG. 2 shows a schematic view of a wind turbine according to another embodiment of the present invention in a first condition.

FIG. 2 shows a schematic view of a wind turbine according to another embodiment of the present invention. Further to the embodiment shown in FIG. 1, the grid connection 150 of the embodiment shown in FIG. 2 includes a grid connector 152 and a bypass connector 154. Grid connector 152 is used to connect the turbine to the utility grid during operation. Bypass connector 154 is connected between the utility grid and the DC link, thus bypassing grid contactor 152 via the free-wheeling diodes of grid-side DC-AC inverter 144 to charge the DC link.

Figure 3:
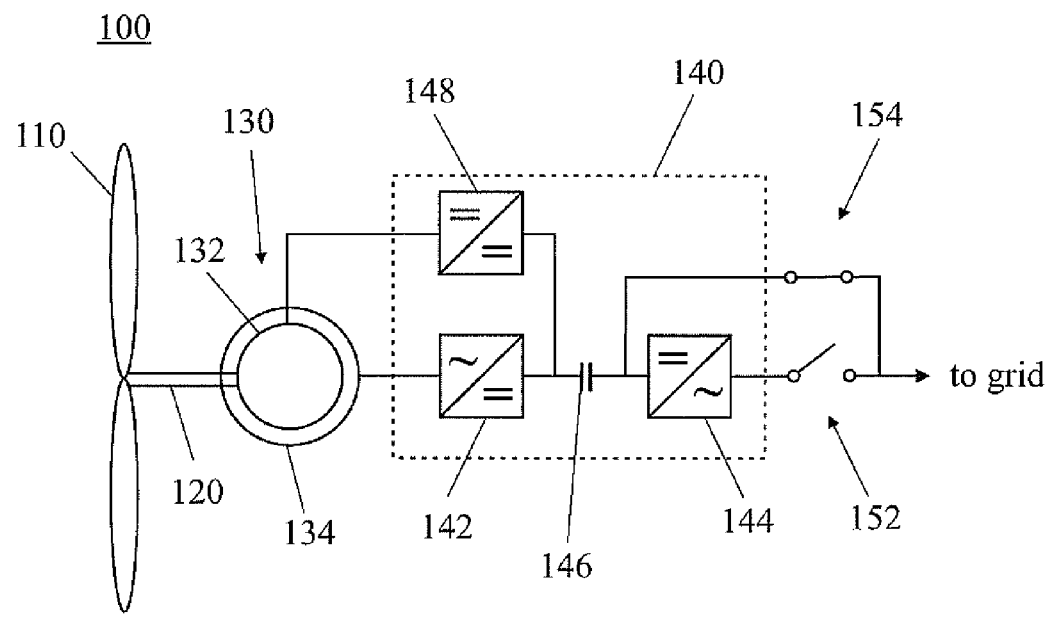
FIG. 3 shows the wind turbine of FIG. 2 in a second condition.
Figure 4:
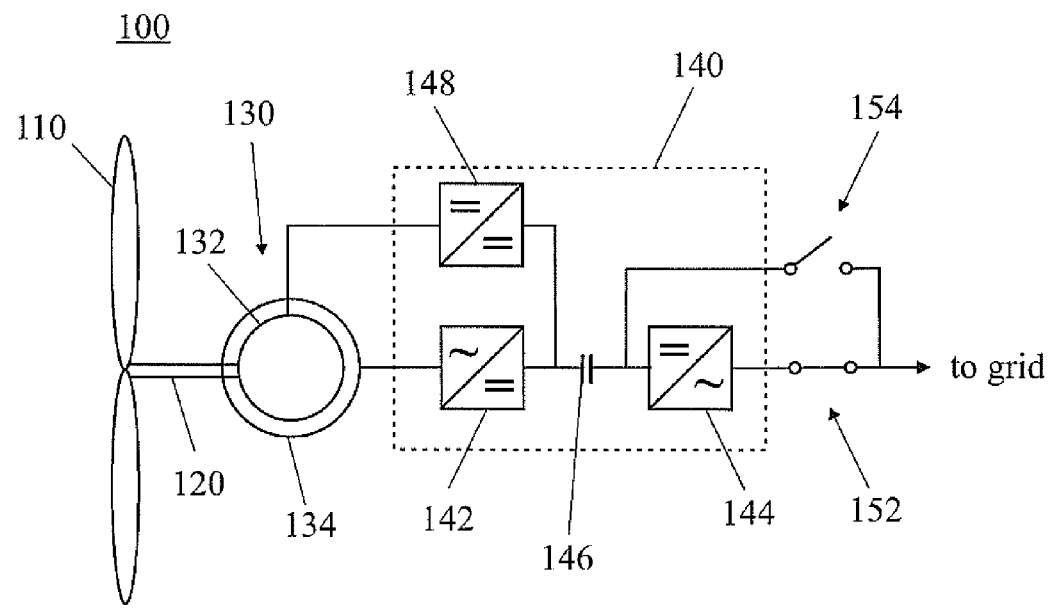
FIG. 4 shows the wind turbine of FIG. 2 in a third condition.
Figure 5:
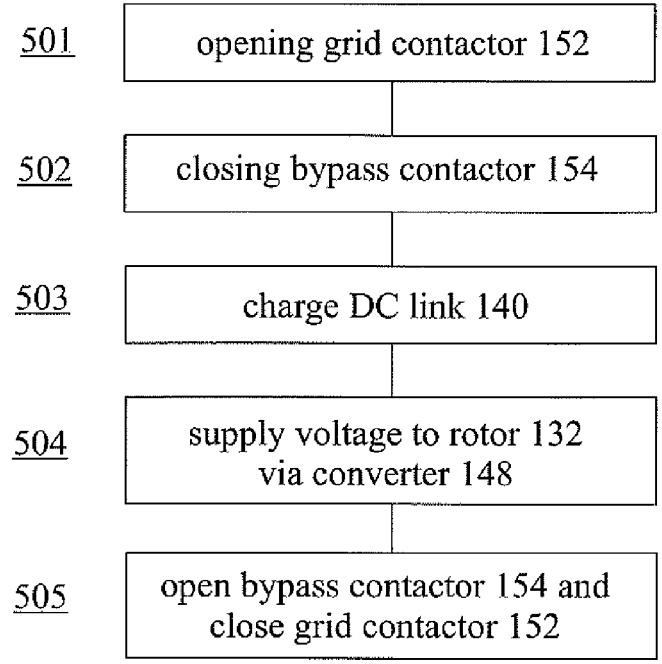
FIG. 5 shows a flow diagram of a method according to a further embodiment of the present invention.

Next, a start-up method for a wind turbine as shown in FIG. 2 is described with reference to FIGS. 2 to 5. Therein, FIG. 2 shows the wind turbine 100 according to the embodiment in a first condition, FIGS. 3 and 4 show the same wind turbine 100 in second and third conditions, respectively. FIG. 5 shows a flow diagram of the method according to an embodiment of the present invention. FIG. 2 shows the condition of the wind turbine when the turbine is out of operation, e.g. after a downtime due to maintenance work. The turbine 100 is disconnected from the utility grid since grid connector 152 and bypass connector 154 have been opened. In a next step 502, the bypass connector 154 is closed so that a connection between the DC link 140 and the grid is established. This is the second condition of wind turbine 100 shown in FIG. 3. However, DC-AC inverter 144 is bypassed since grid connector 152 is still in its open state. After closing bypass connector 154 in step 502, the DC link 140 including DC link capacitor 146 is charged in step 503. When the DC link voltage attains a threshold value, DC-DC converter 148 starts to supply DC voltage to the rotor windings of generator rotor 132 in step 504, thus generating an excitation field for synchronous generator 130. Now, generator 130 starts to produce electric power which is supplied to AC-DC inverter 142. After the system has reached the operating level, the bypass contactor 154 is opened and grid contactor 152 is closed in step 505. This is the third condition of wind turbine 100 which is shown in FIG. 4. Thus, the start-up of wind turbine 100 has been accomplished. The method and wind turbine according to the embodiments of the present invention does not require an additional connection between the grid and the rotor windings for the start-up. Thus, the overall configuration of the wind turbine as well as the method itself are of reduced complexity compared with prior art wind turbine systems and/or starting methods which utilize such additional connections between grid and rotor.

According to a further embodiment of the present invention, method step 504 of supplying the excitation voltage to the rotor windings includes the conversion of the typically high DC link voltage into a typically lower excitation voltage. Typically, converting the DC link voltage into the excitation voltage is carried out with a conversion ratio in the range of about 20:1 to 2:1, more typically in the range of about 12:1 to 5:1. According to a further typical embodiment, the AC-DC inverter 142 and the DC-AC inverter 144 are synchronized before the wind turbine is connected to the grid, i.e. before step 505.

Figure 6:
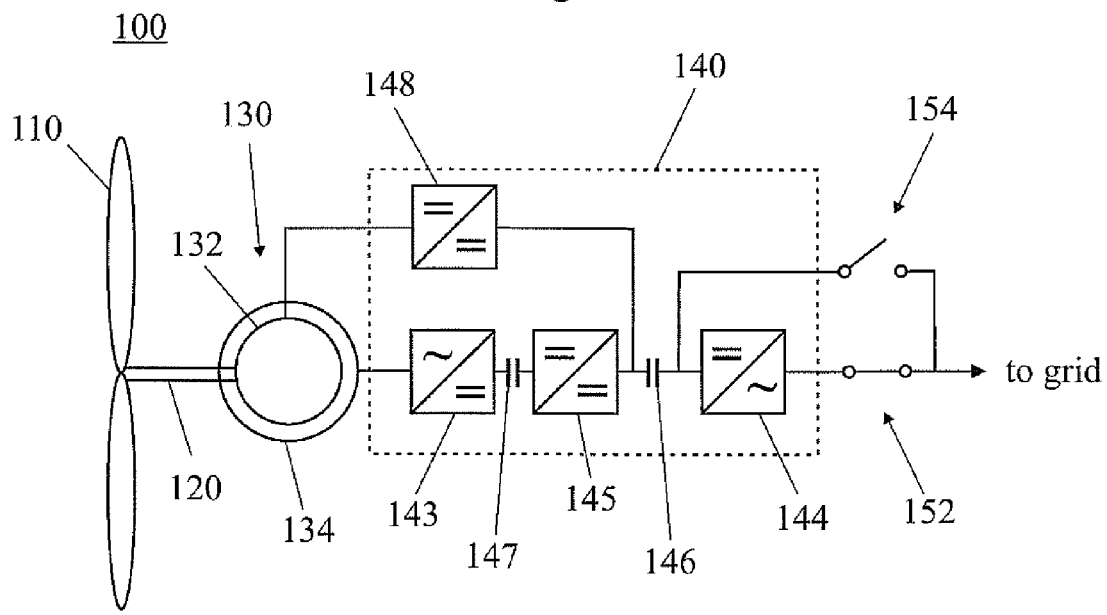
FIG. 6 shows a schematic view of a wind turbine according to an even further embodiment of the present invention.

FIG. 6 shows a schematic view of a wind turbine according to a further embodiment of the present invention. Therein, the stator windings of the generator 130 are connected with a bridge rectifier circuit 143, typically realized by a diode bridge. Typically, bridge rectifier circuit 143 is does not require IGBTs and is, therefore, available at lower price compared to AC-DC inverter 142. However, rectifier bridge circuit 143 cannot be controlled to the same extent as inverter 142. Furthermore, the DC link includes a step-up converter 145 for increasing the DC link voltage. In addition to DC link capacitor 146, a further DC link capacitor 147 is typically connected between rectifier bridge circuit 143 and step-up converter 145. As in the above described embodiments, the DC link voltage is used to feed the excitation circuit of the generator rotor 132 via a converter 148. Although the configuration of the wind turbine 100 is somewhat different from the above-described embodiments, the operation thereof is basically as described above so that details are omitted.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A wind turbine comprising,
    a synchronous generator having a stator and a rotor,
    an AC-DC-AC link for coupling said synchronous generator to a grid, the AC-DC-AC link comprising a DC link, and
    a DC-DC converter connecting the DC link to a rotor winding of the rotor,
    wherein the DC link used for supplying an excitation voltage to the rotor winding of said rotor.

2. The wind turbine according to claim 1, wherein the generator is an electrically excited synchronous generator.

3. The wind turbine according to claim 1, wherein said DC-DC converter has a conversion ratio in the range of about 20:1 to 2:1.

4. The wind turbine according to claim 1, wherein the DC link provides a ride-through capability of the rotor excitation voltage for one or more seconds.

5. The wind turbine according to claim 1, wherein DC link provides a ride-through capability of the rotor excitation voltage for low voltage and zero voltage excursions of a grid voltage.

6. The wind turbine according to claim 1, wherein a DC link voltage drops for a maximum of 1 to 10% compared to normal DC link voltage during a zero grid voltage excursion.

7. The wind turbine according to claim 1, wherein the DC link is decoupled from grid.

8. The wind turbine according to claim 1, wherein the AC-DC-AC link further comprises a generator-side AC-DC inverter and a grid-side DC-AC inverter, wherein the DC link is formed between the generator-side AC-DC inverter and the grid-side DC-AC inverter.

9. The wind turbine according to claim 1, further comprising a bypass contactor for bypassing a grid-side DC-AC inverter.

10. A wind turbine comprising,
    a synchronous generator having a stator and a rotor,
    an AC-DC-AC link for coupling said synchronous generator to a grid, the AC-DC-AC link comprises a generator-side AC-DC inverter, a DC link, and a grid-side DC-AC inverter,
    a DC-DC converter connecting the DC link to a rotor winding of the rotor,
    wherein the DC link is configured to supply an excitation voltage to the rotor winding of the rotor, and
    wherein the generator-side AC-DC inverter, the grid-side DC-AC inverter, and the DC-DC converter are integrated into one component.

11. An intermediate DC voltage circuit for a wind turbine, comprising
    a generator-side AC-DC inverter adapted to be coupled to stator windings of a synchronous generator of the wind turbine;
    a grid-side DC-AC inverter adapted to be coupled to a utility grid;
    a circuit connecting said generator-side AC-DC inverter and said grid-side DC-AC inverter; and
    a DC-DC converter adapted to be connected between said circuit and rotor windings of said synchronous generator.

12. The intermediate DC voltage circuit according to claim 11, wherein said DC-DC converter has a conversion ratio in the range of about 20:1 to 2:1.

13. The intermediate DC voltage circuit according to claim 11, wherein a DC link voltage drops for a maximum of 1 to 10% compared to an operational DC link voltage during a zero grid voltage excursion.

14. The intermediate DC voltage circuit according to claim 11, further comprising a bypass contactor for bypassing the grid-side DC-AC inverter.

15. A method of starting a wind turbine with an electrically excited synchronous generator, comprising the steps of:
    (a) opening a grid contactor;
    (b) closing a bypass contactor to bypass a grid-side DC-AC inverter of said wind turbine;
    (c) charging a DC link of said wind turbine;
    (d) supplying an excitation voltage to rotor windings of said synchronous generator, wherein said excitation voltage is supplied from the DC link; and
    (e) opening said bypass connector and closing said grid connector.

16. The method according to claim 15, wherein step (d) comprises the step of converting the DC link voltage to a generator excitation voltage.

17. The method according to claim 16, wherein conversion is carried out with a conversion ratio in the range of about 20:1 to 2:1.

18. The method according to claim 15, wherein the grid-side DC-AC inverter is synchronized with a grid frequency prior to step (e).

19. The method according to claim 15, wherein a generator-side AC-DC inverter is synchronized with a grid frequency prior to step (e).

* * * * *